Patented Apr. 27, 1926.

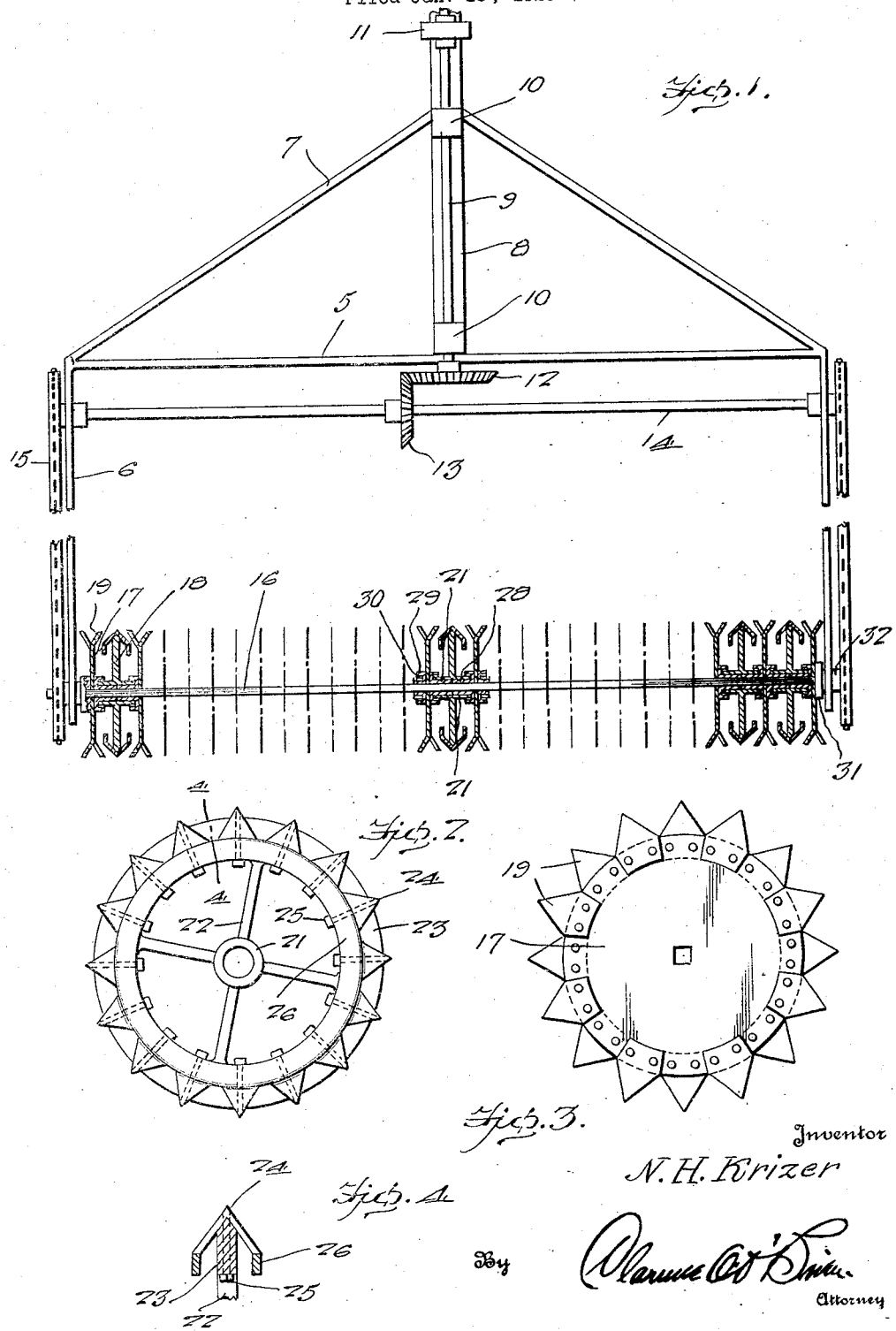

1,582,827

UNITED STATES PATENT OFFICE.

NEWTON H. KRIZER, OF ROSE HILL, IOWA.

ROTARY HARROW AND SOIL PULVERIZER.

Application filed January 13, 1925. Serial No. 2,166.

*To all whom it may concern:*

Be it known that I, NEWTON H. KRIZER, a citizen of the United States, residing at Rose Hill, in the county of Mahaska and State of Iowa, have invented certain new and useful Improvements in a Rotary Harrow and Soil Pulverizer, of which the following is a specification.

The present invention relates to an agricultural implement especially designed to provide improvements for pulverizing hard and cloddy ground, for breaking and pulverizing any compact surface, for shredding corn stalks and other litter, for restoring sod pastures and meadows, for surfacing public highways, and for preparing seed beds of all kinds.

The invention further aims to provide a very simple and efficient structure of this nature, which is reliable in operation, comparatively inexpensive to construct, strong, durable, not liable to readily get out of order, and otherwise well adapted for the purpose for which it is designed.

With the above and other objects in view, as will appear as the description proceeds, the invention resides in certain novel features of construction, and in the combination and arrangement of parts as will be hereinafter more fully described and claimed.

In the drawing:

Figure 1 is a top plan view of the implement embodying the features of my invention, showing portions in section.

Figure 2 is a detail side elevation of the pressure and carrier wheel.

Figure 3 is a detail elevation of a modified form of the harrow pulverizer and shredder wheel, and Figure 4 is an enlarged detail section, taken substantially on the line 4—4 of Figure 2, looking in the direction of the arrow.

Referring to the drawing in detail, it will be seen that the implement is provided with a suitable frame, which, in the present instance, consists of a cross bar 5, having the two rearwardly extending side bars 6, and the forwardly converging brace bars 7. A draw bar 8, of suitable construction, extends forwardly of the cross bar 5, and is connected to the forward ends of the brace bars 7. The driving means, which I have shown, may be changed as desired, and as herein illustrated, by way of example, consists of a shaft 9, rotatable in journals 10 on the draw bar 8 and provided with a universal coupler 11, on its forward end, and its rear end with a bevelled gear 12, meshing with gear 13 on shaft 14, journaled transversely through the side bars 6, and having on its ends suitable sprockets for driving chains 15, which, in turn, are trained over sprockets on the main shaft 16, for driving the same.

A plurality of wheels are mounted on the shaft 16, for rotation therewith and thereby. These wheels are indicated by numerals 17 and 18, and are alternately arranged, as is indicated to advantage in Figure 1. Wheel 17 is utilized as a harrow pulverizer and shredder consisting of a disc body having alternately outwardly integral or detachable slanted teeth 19, at its periphery. If desired, these teeth may be detachably mounted on the disc body, as shown in Figure 3, being arranged on opposite sides thereof alternately. Each wheel 18 consists of a hub 21, having a number of spokes 22 radiating therefrom and supporting a felly 23. A rim is disposed over this felly 23, consisting of a plurality of V-shaped teeth 24, the apexes of which are bolted to the outer periphery of the felly, as at 25, and at the ends of the teeth are formed integral with rings 26, one disposed on each side of the wheel.

Sleeves 28 are disposed on the square shaft 16, to rotate therewith, and are provided with collars 29. The sleeves are arranged in end-to-end relation as clearly indicated in Figure 1, and disposed one on each side of the intermediate wheels 17 and one on the inner side of each end wheel 17. The hubs 21 of wheels 18 are disposed over the sleeves 28 having their ends within the annular flanges 29, and felt rings 30 are disposed between the hubs 21 and annular flanges or collars 29. The fastening elements 31 of any suitable type hold the parts assembled on the shaft 16. The pulverizing wheels 17 are thus clamped between the sleeves and will rotate therewith.

These pulverizing wheels 17 are adapted to be rotated at a high rate of speed from a suitable motor or the like, while the wheels 18 act as carrier wheels and rotate with the travel of the machine, and the hubs 21 thereof act as journals for the sleeves as the machine is progressing along. Sleeves 28 are provided at the ends of the shaft 16 and are journaled through the side bars 6.

The wheels 17 and 18 are the most important features of my invention, and are constructed so as to be light in weight and yet possess great strength. The objects and advantages of the invention should now be evident to those skilled in the art, but it is desired to point out that numerous changes in the details of construction, and in the combination and arrangement of parts may be resorted to, without departing from the spirit or scope of the invention as hereinafter claimed, or sacrificing any of its advantages.

Having thus described my invention, what I claim as new is:

In combination, a squared shaft, a plurality of shredder wheels mounted on the shaft to rotate therewith, said wheels including cylindrical hubs to provide bearings, and roller wheels on the bearings free to rotate with relation to the shredder wheels.

In testimony whereof I affix my signature.

NEWTON H. KRIZER.